United States Patent [19]

Peterson

[11] Patent Number: 4,646,987
[45] Date of Patent: Mar. 3, 1987

[54] TAKE-UP REEL FOR TAPE CONTAINING CONDUCTORS

[76] Inventor: Edwin R. Peterson, 1647 Sendero La., Boise, Id. 83702

[21] Appl. No.: 776,672

[22] Filed: Aug. 30, 1985

[51] Int. Cl.[4] .................. B65H 75/48; H04M 1/04; H02G 11/02
[52] U.S. Cl. ............... 242/107.11; 379/438; 191/12.2 R
[58] Field of Search .......... 242/107.1, 107.11, 107.12, 242/107, 100.1, 86.1; 191/12.2 R, 12.4; 179/178, 155

[56] References Cited

U.S. PATENT DOCUMENTS

| | | | |
|---|---|---|---|
| 1,620,562 | 3/1927 | Licht | 191/12.4 |
| 3,319,907 | 5/1967 | McAninch et al. | 242/107.11 |
| 3,402,901 | 9/1968 | Van Houten | 242/107.11 |
| 3,483,898 | 12/1969 | Tini | 179/159 |
| 4,107,804 | 8/1978 | Bennett | 9/8 R |
| 4,116,402 | 9/1978 | Nomura et al. | 242/107.1 |
| 4,165,053 | 8/1979 | Konig | 242/107.1 |
| 4,384,688 | 5/1983 | Smith | 242/107.7 |

FOREIGN PATENT DOCUMENTS 166920 4/1934 Switzerland .

Primary Examiner—Stuart S. Levy
Assistant Examiner—David Werner
Attorney, Agent, or Firm—Lee R. Schermerhorn

[57] ABSTRACT

A tape containing communication conductors, such as telephone wires, or conductors for other purposes, is connected at mid-length to the hub of a spring operated takeup reel so that the reel winds in the opposite end portions of the tape one on top of each other in a single roll of tape. The reel, including its housing, is supported by the opposite ends of the tape.

1 Claim, 5 Drawing Figures

TAKE-UP REEL FOR TAPE CONTAINING CONDUCTORS

BACKGROUND OF THE INVENTION

This invention relates to a take-up reel for a tape containing conductors, as for example for a telephone hand piece.

Various expedients have heretofore been proposed for dealing with the problem of a loose telephone cord extending between the hand piece and its support, which is usually on a desk or table. A conventional coiled cord gets stretched out during use and fails to return to its intended relaxed length. Double reel take-up devices have been proposed but such mechanisms have proved to be too bulky and too expensive to manufacture.

There is a need for a take-up device for this and other purposes which is more compact and inexpensive to manufacture, which will provide a greater useful length of the cord and which will take up the entire length of the loose cord when the instrument is not in use.

SUMMARY OF THE INVENTION

The present device achieves the objectives mentioned above. A tape containing conductors such as telephone wires is connected at mid-length to the hub of a spring operated take-up reel so that the reel winds in the opposite end portions of the tape one on top of the other in a single compact roll of tape.

The conductors are enclosed side by side in a relatively thin and narrow tape, which greatly reduces the bulk of the roll and allows the use of a relatively long tape, which in a telephone is a great convenience to the user. The reel including its housing is supported by the opposite ends of the tape and takes in all of the loose tape leaving no loose portions to clutter the desk or table which carries the instrument.

The invention will be better understood and additional features and advantages will become apparent from the following description of the preferred embodiment illustrated in the accompanying drawing. The invention is not limited to use with telephones and additional features and advantages will become apparent in the following description. Various changes may be made in the details of construction and arrangement of parts and certain features may be used without others. All such modifications within the scope of the appended claims are included in the invention.

DESCRIPTION OF THE PREFERRED EMBODIMENT

Figure 1:
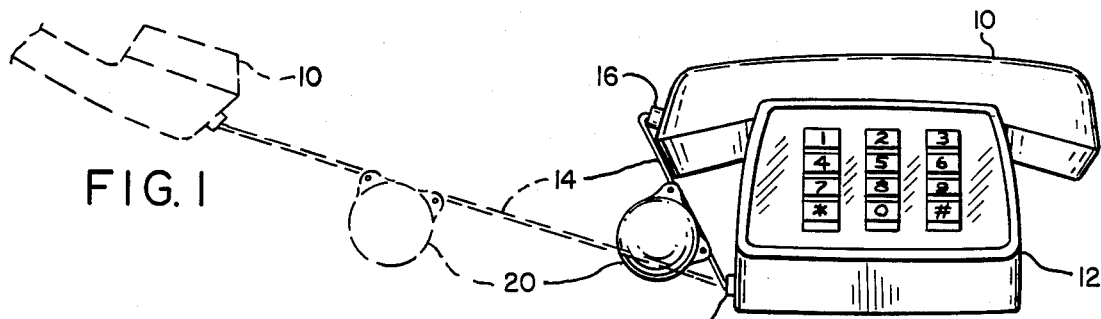
FIG. 1 is front elevation view of a telephone equipped with the present take-up reel unit.
Figure 2:
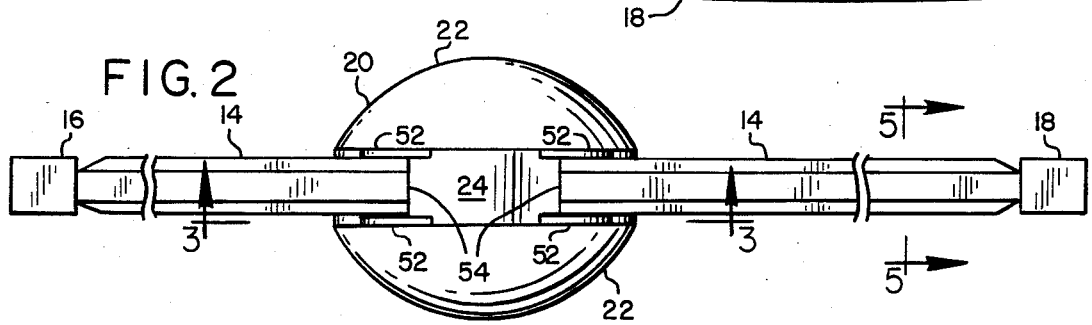
FIG. 2 is a top plan view of the reel unit with the ends of the tape extended therefrom in opposite directions.
Figure 3:
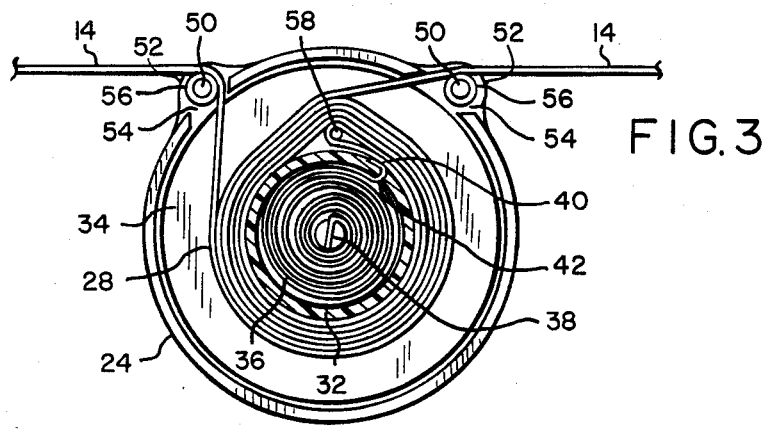
FIG. 3 is a sectional view on the line 3—3 in FIG. 2.

FIG. 1 shows in solid lines a conventional telephone having a hand piece 10 resting in normal position on its support 12 on a desk or table. Hand piece 10 is electrically connected to support 12 by a length of flat tape 14 having a first standard modular phone jack 16 on one end of the tape plugged into hand piece 10 and a second standard modular phone jack 18 on the other end plugged into support 12. The tape 14 contains fine wires interconnecting the phone jacks 16 and 18.

Tape 14 is of considerable length and the slack is taken up by a reel unit 20. In use, the hand piece is removed from its support as shown in broken lines.

The opposite sides of reel unit 20 are covered by a pair of spherically curved outer shells 22. Between the shells 22 is a cylindrical frame housing member 24 having and end wall 26 carrying a slotted axial post or stem 28.

Within the frame 24 a reel 30 has a cylindrical tape winding surface 32 between a pair of end flanges 34. A flat coil spring 36 has a bent inner end 38 hooked in the slot in the stationary post 28 and a bent outer end 40 hooked into a slot 42 in the cylindrical winding surface 32 of the reel 30. When the spring is tightened for assembly it is entirely contained within the bore of cylindrical winding surface 32 and the reel and spring are enclosed and confined in cylindrical frame 24 by a cover plate 44.

Cover plate 44 has a central opening 46 to receive the end of post 28 and a pair of ears having marginal openings 48 to receive pins 50 mounted in ears 52 in the frame member 24. Pins 50 are adjacent a pair of slots 54 in the cylindrical portion of frame 24 and these pins are provided with rollers 56 to support and guide the tape 14 as it moves in and out of slots 54. The free ends of pins 50 make be threaded and equipped with nuts to secure the cover plate 44.

Figure 4:
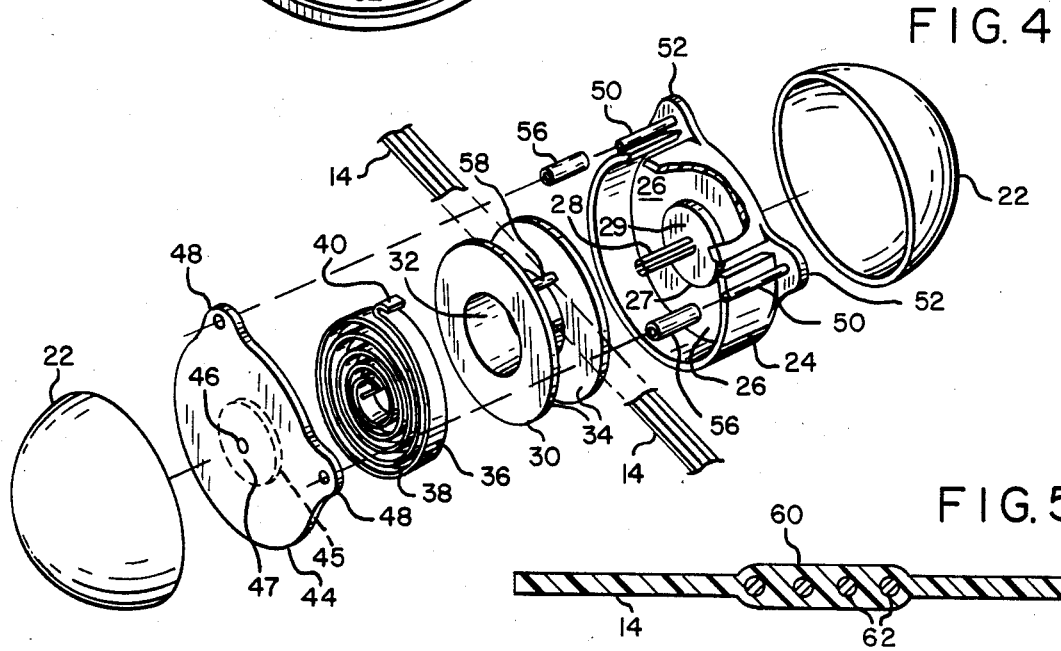
FIG. 4 is an exploded view of the reel unit.

Reel 30 is supported for rotation on a pair of cylindrical bearing shoulders 27 and 45. Shoulder 27 is formed by an inwardly thickened central portion 29 of end wall 26 on housing member 24 and shoulder 45 is formed by an inwardly thickened central portion 47 of cover plate 44 as seen in FIG. 4. Opposite ends of reel cylindrical surface 32 ride on these two shoulders as the reel rotates. Thickened wall portions 29 and 47 confront opposite sides of coil spring 36.

At its mid-length point the tape 14 is looped around a pin 58 extending between the reel flanges 34 adjacent the cylindrical reel winding surface 32. Thus, the spring 36 pulls in both opposite end portions of the tape, winding one end portion on top of the other until all of the free length of the tape is contained on the reel as shown in FIG. 1.

In this process the opposite end portions of the tape pass over rollers 56 and through the slots 54. This arrangement provides a very compact and lightweight single reel take-up device for telephone cords and other purposes which is inexpensive to manufacture and allows for a relatively long tape without any part of the tape being in slack condition on the supporting desk or table or hanging therefrom.

Figure 5:
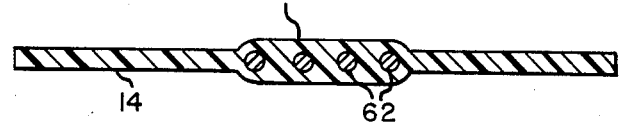
FIG. 5 is an enlarged cross sectional view of the tape on the line 5—5 in FIG. 2.

As seen in FIG. 5, the tape 14 is preferably made of a synthetic fiber material having a thickened central portion 60 containing the telephone wires 62 or conductors for other portable or manipulated equipment. Conductors 62 may be light transmitting fibers in fiber optics systems.

In the illustrated embodiment the tape 14 is 0.370 inch wide and 0.020 inch thick in its central portion, allowing a tape five feet long to be wound on a reel unit 20 only two inches in outside diameter. The invention is not limited to these specific dimensions however.

What is claimed is:

1. A take-up reel unit including a tape containing a conductor extending within the tape from end to end thereof, connector fittings for said conductor on opposite ends of said tape.
- a pin interconnecting end flanges on a reel in a hub portion of the reel, said tape being looped at mid length around said pin to secure the tape to the reel,
- a housing comprising a cylindrical frame enclosing said reel for rotation therein, separate openings in said housing for opposite end portions of said tape, said reel and housing being supported by said end portions of said tape,
- an end wall on said cylindrical frame having a pair of ears projecting radially therefrom adjacent said openings, and pins in said ears supporting rollers for the tape,
- said hub portion of said reel comprising a cylindrical tape winding member, a thickened central portion in said end wall of said frame having a cylindrical shoulder projecting into one end of said reel member and providing a supporting bearing for the reel, a cover plate for said housing mounted on said pins, and a thickened central portion in said cover plate having a cylindrical shoulder projecting into the opposite end of said reel and providing a second supporting bearing for the reel,
- a coil spring for rotating said reel to wind opposite end portions of said tape on top of each other in a single roll of tape on the reel,
- an axial stem on said end wall of said frame for anchoring an inner end of said spring within the hub of the tape reel, and a pair of shells covering said end wall and cover plate.

* * * * *